United States Patent
Zheng et al.

(10) Patent No.: US 11,301,250 B2
(45) Date of Patent: Apr. 12, 2022

(54) DATA PREFETCHING AUXILIARY CIRCUIT, DATA PREFETCHING METHOD, AND MICROPROCESSOR

(71) Applicant: Shanghai Zhaoxin Semiconductor Co., Ltd., Shanghai (CN)

(72) Inventors: Xianpei Zheng, Shanghai (CN); Zhongmin Chen, Shanghai (CN); Weilin Wang, Shanghai (CN); Jiin Lai, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 196 days.

(21) Appl. No.: 16/594,090

(22) Filed: Oct. 7, 2019

(65) Prior Publication Data

US 2021/0042120 A1 Feb. 11, 2021

(30) Foreign Application Priority Data

Aug. 5, 2019 (CN) .......................... 201910715920.4

(51) Int. Cl.
*G06F 12/00* (2006.01)
*G06F 13/00* (2006.01)
(Continued)

(52) U.S. Cl.
CPC ........ *G06F 9/3455* (2013.01); *G06F 9/30029* (2013.01); *G06F 9/30047* (2013.01); *G06F 9/3824* (2013.01); *G06F 9/3855* (2013.01)

(58) Field of Classification Search
CPC .... G06F 9/3455; G06F 9/30047; G06F 9/383; G06F 2212/6026
(Continued)

(56) References Cited

U.S. PATENT DOCUMENTS

| | | | | |
|---|---|---|---|---|
| 2008/0016330 A1* | 1/2008 | El-Essawy | .......... | G06F 12/0862 712/225 |
| 2011/0238923 A1* | 9/2011 | Hooker | ............... | G06F 12/0862 711/137 |

(Continued)

FOREIGN PATENT DOCUMENTS

| | | |
|---|---|---|
| CN | 101751246 | 6/2010 |
| CN | 102640124 | 8/2012 |

(Continued)

OTHER PUBLICATIONS https://www.merriam-webster.com/dictionary/multiple (Year: 2021).*
(Continued)

*Primary Examiner* — Edward J Dudek, Jr.
*Assistant Examiner* — Sidney Li
(74) *Attorney, Agent, or Firm* — JCIPRNET

(57) ABSTRACT

The disclosure provides a data prefetching auxiliary circuit, a data prefetching method, and a microprocessor. The data prefetching auxiliary circuit includes a stride calculating circuit, a comparing module, a stride selecting module, and a prefetching output module. The stride calculating circuit receives an access address to calculate and provide a stride. The comparing module receives the access address and the stride, generates a reference address based on a first multiple, the access address and the stride, determines whether the reference address matches any of a plurality of history access addresses, and generates and outputs a hit indicating bit value. The stride selecting module receives the hit indicating bit value, and determines whether to output the hit indicating bit value based on a prefetch enabling bit value. The prefetching output module determines a prefetch address according to the output of the stride selecting module.

30 Claims, 4 Drawing Sheets

(51) Int. Cl.
    *G06F 13/28*    (2006.01)
    *G06F 9/345*    (2018.01)
    *G06F 9/30*     (2018.01)
    *G06F 9/38*     (2018.01)

(58) Field of Classification Search
    USPC .......................................................... 711/217
    See application file for complete search history.

(56) References Cited

U.S. PATENT DOCUMENTS

| | | | |
|---|---|---|---|
| 2017/0329608 A1* | 11/2017 | Eickemeyer | G06F 12/0862 |
| 2019/0087345 A1 | 3/2019 | Hijaz et al. | |
| 2019/0138451 A1 | 5/2019 | Alam et al. | |
| 2020/0097411 A1* | 3/2020 | Pusdesris | G06F 9/3455 |

FOREIGN PATENT DOCUMENTS

| | | |
|---|---|---|
| CN | 105378684 | 3/2016 |
| CN | 106021128 | 10/2016 |
| CN | 106293624 | 1/2017 |
| CN | 107229576 | 10/2017 |
| CN | 107636626 | 1/2018 |
| CN | 107870873 | 4/2018 |

OTHER PUBLICATIONS

"Office Action of China Counterpart Application", dated Dec. 15, 2020, pp. 1-12.

* cited by examiner

DATA PREFETCHING AUXILIARY CIRCUIT, DATA PREFETCHING METHOD, AND MICROPROCESSOR

CROSS-REFERENCE TO RELATED APPLICATION

This application claims the priority benefit of China application serial no. 201910715920.4, filed on Aug. 5, 2019. The entirety of the above-mentioned patent application is hereby incorporated by reference herein and made a part of this specification.

TECHNICAL FIELD

The disclosure relates to the field of microprocessors and more particularly, to a data prefetching auxiliary circuit and a data prefetching method in a microprocessor.

BACKGROUND

The concept of data prefetching in microprocessors is well known to the public. To avoid miss from occurring in a high-speed cache, accessing a system memory takes a considerable amount of latency since a microprocessor has to detect a most recently requested access address of a memory to predict data required in the future and prefetch the predicted data to the high-speed cache of the microprocessor.

However, in the prior art, due to the lack of a real-time run-time evaluation mechanism in the data prefetching method, a prefetching accuracy remains unknown. In this case, the prefetching mechanism will tend to be conservative so that only the nearby cache lines are prefetched, resulting in a defect with too small coverage. Moreover, if only the nearby cache lines are prefetched, a timeliness of the prefetching mechanism may also be affected overall.

Therefore, it is an important issue for those skilled in the art to design a more aggressive data prefetching mechanism with better coverage and timeliness.

SUMMARY

Accordingly, the disclosure provides a data prefetching auxiliary circuit, a data prefetching method and a microprocessor, which are capable of providing the more aggressive data prefetching mechanism with better coverage and timeliness.

The disclosure provides a data prefetching auxiliary circuit, which includes a stride calculating circuit, a comparing module, a stride selecting module, and a prefetching output module. The stride calculating circuit receives an access address to calculate and provide a stride between the access address and a previous access address.

The comparing module is coupled to the stride calculating circuit, receives the access address and the stride, generates a reference address based on a first multiple, the access address and the stride, determines whether the reference address matches any of a plurality of history access addresses, and generates and outputs a hit indicating bit value. The stride selecting module is coupled to the comparing module, receives the hit indicating bit value, and determines whether to output the hit indicating bit value based on a prefetch enabling bit value. The prefetching output module is coupled to the stride selecting module, and determines the prefetch address according to the output of the stride selecting module.

The disclosure provides a data prefetching method, which includes: receiving an access address, and calculating and providing a stride between the access address and a previous access address. A reference address is generated based on the access address, the stride and a first multiple, and whether the reference address matches any of a plurality of history access addresses is determined to generate a hit indicating bit value. Whether the hit indicating bit value is selected is determined according to a prefetch enabling bit value, and a prefetch address is determined according to whether the hit indicating bit value is selected.

The disclosure provides a microprocessor, which includes a pipeline system and a prefetching system. The prefetching system includes a first memory, a second memory, a first data prefetching auxiliary circuit and a first data prefetcher. The first memory generates and outputs a first access address. The second memory is coupled to the first memory. The first data prefetching auxiliary circuit is coupled to the first memory to receive the first access address, and generates and outputs a second prefetch address to a first prefetch queue. The first data prefetcher reads the second prefetch address from the first prefetch queue to generate a first prefetch instruction, and the first prefetch instruction instructs prefetching data corresponding to the second prefetch address in the second memory to the first memory.

Based on the above, the data prefetching auxiliary circuit, the data prefetching method and the microprocessor provided by the present disclosure can detect whether the reference address separated from the current access address by one or more strides is previously provided to the data prefetching auxiliary circuit as one history access address. If the reference address is one history access address in the past, and has the prefetch enabling bit value corresponding to the stride multiple in an enabled state, the data prefetching auxiliary circuit can then use the reference address as the prefetch address to support the subsequent data prefetching operation. In this way, the accuracy, the coverage and the timeliness of the data prefetching mechanism may be improved to reduce the chance of cache miss.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
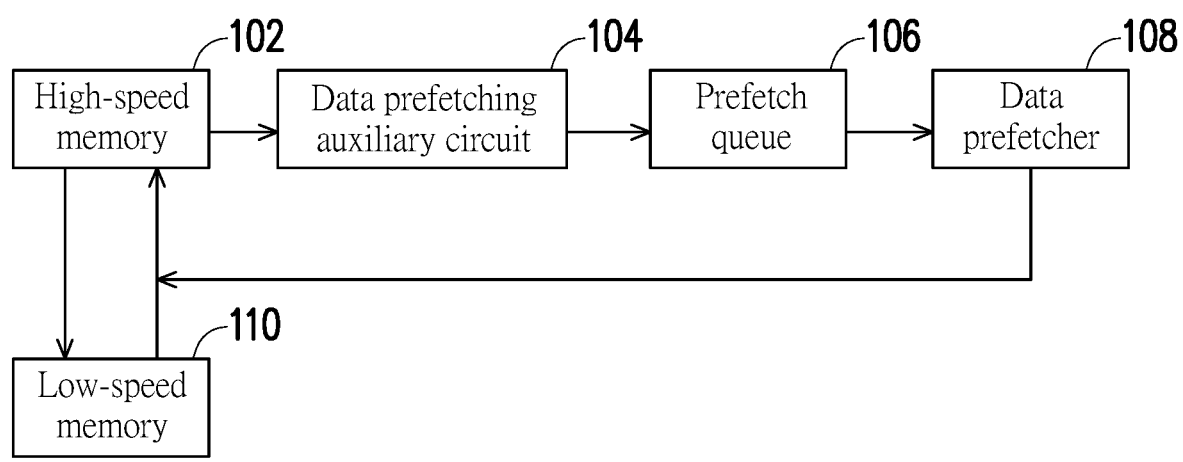
FIG. 1 is a block diagram of a prefetching system in an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With reference to FIG. 1, FIG. 1 is a block diagram of a prefetching system 100 in an embodiment of the disclosure. In FIG. 1, the prefetching system 100 includes a high-speed memory 102, a data prefetching auxiliary circuit 104, a prefetch queue 106, a data prefetcher 108 and a low-speed memory 110.

As shown in FIG. 1, the high-speed memory 102 is coupled to the low-speed memory 110 to support a data read/write operation with the low-speed memory 110. The high-speed memory 102 is coupled to the data prefetching auxiliary circuit 104 to provide an access address to the data prefetching auxiliary circuit 104. The data prefetching auxiliary circuit 104 is coupled to the prefetch queue 106 to write a prefetch address into the prefetch queue 106. The data prefetcher 108 is coupled to the prefetch queue 106 to read the prefetch address and generate a prefetch request according to the prefetch address. The prefetch request instructs prefetching specific data in the low-speed memory 110 to the high-speed memory 102. Here, the specific data refers to data corresponding to the prefetch address.

According to an embodiment of the disclosure, when intending to obtain data from the prefetching system 100, a processor first searches for whether the data is in the high speed memory 102. If the data is in the high-speed memory 102 (i.e., hit), the data is directly obtained from the high-speed memory 102. If the data is not in the high-speed memory 102 (i.e., miss), the low-speed memory 110 at a lower level is then searched. If the data is in the low-speed memory 110 (i.e., hit), the data is copied to the high speed memory 102 and then obtained from the high speed memory 102 by the processor. If the data is not in the high-speed memory 110 (i.e., miss), a low-speed memory at an even lower level is then searched.

The prefetching system 100 generates the prefetch request through the data prefetcher 108 according to at least one prefetch address written in the prefetch queue 106 by the data prefetching auxiliary circuit 104, and instructs copying data in the low-speed memory 110 to the high-speed memory 102 in advance so as to further improve the efficiency of the processor for fetching the data.

According to an embodiment of the disclosure, the data prefetching auxiliary circuit 104 receives the access address from the high-speed memory 102, and determines whether the access address is the prefetch address that needs to be written into the prefetch queue 106. Also, the data prefetching auxiliary circuit 104 stores and continuously refreshes a plurality of history access addresses from the high-speed memory 102 so that the plurality of history access addresses correspond to data most commonly used or repeatedly used by the processor. Specific operation will be detailed below.

Figure 2:
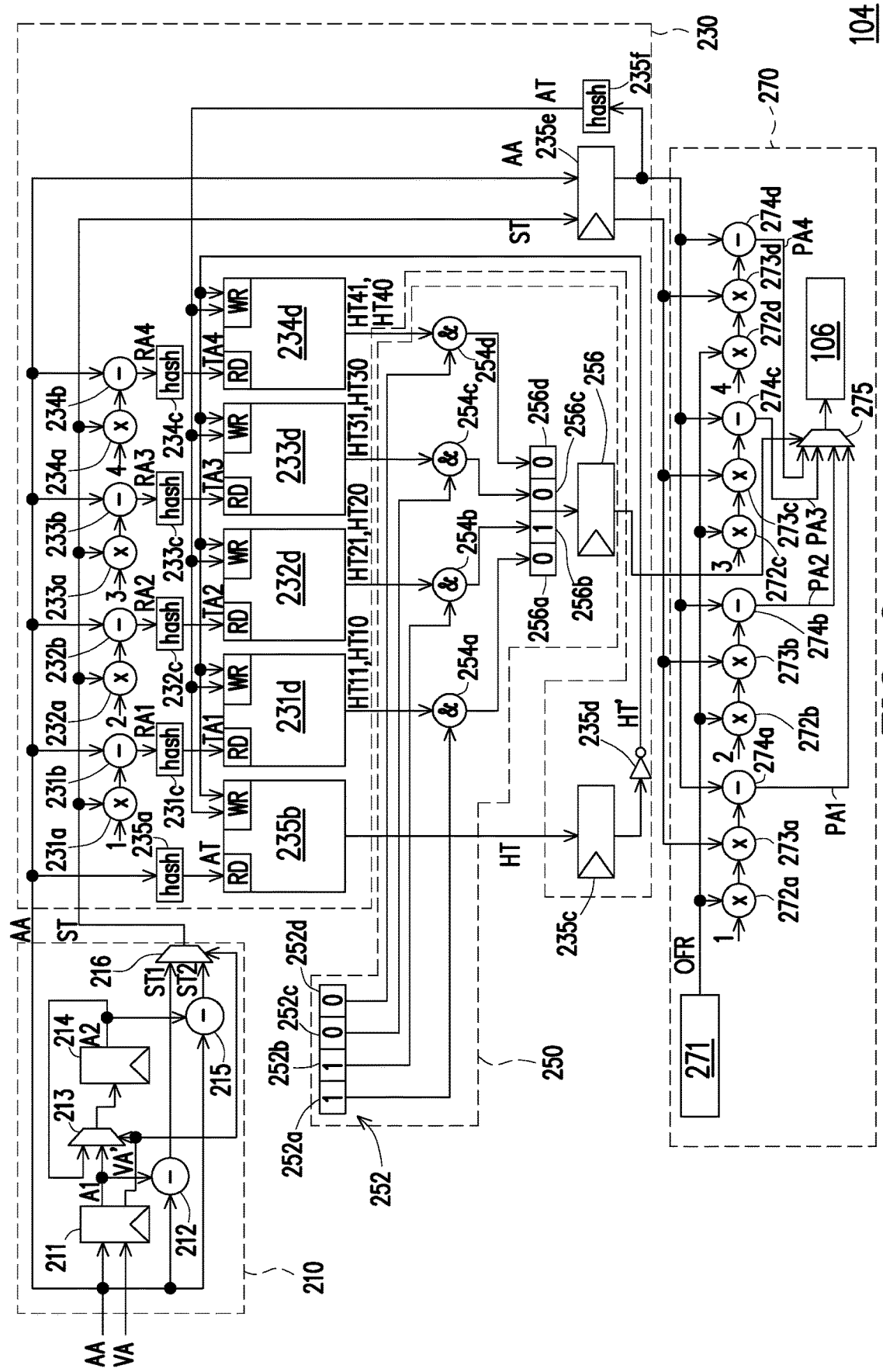
FIG. 2 is a schematic diagram of the data prefetching auxiliary circuit in an embodiment of the disclosure.

FIG. 2 is a schematic diagram of the data prefetching auxiliary circuit 104 in an embodiment of the disclosure. With reference to FIG. 2, the data prefetching auxiliary circuit 104 includes a stride calculating circuit 210, a comparing module 230, a stride selecting module 250, and a prefetching output module 270.

As shown by FIG. 2, the stride calculating circuit 210 receives an access address AA from the high-speed memory 102, and outputs a stride ST between the access address AA and a previous access address. The stride calculating circuit 210 includes a first register 211', a first subtractor 212, a first multiplexer 213, a second register 214, a second subtractor 215 and a second multiplexer 216. The first register 211 receives the access address AA and an address valid signal VA, and provides a previous address valid signal VA' and a first previous access address A1.

In this embodiment, the previous address valid signal VA' and the first previous access address A1 are signals currently output from the first register 211, i.e., signals previously received and stored by the first register 211. The address valid signal VA and the access address AA are, for example, signals currently received by the first register 211. According to one embodiment of the invention, the first previous access address A1 may be considered as a previous access address AA. The previous address valid signal VA' may be used to indicate a validity of the first previously access address A1, and may be functioned on both the first multiplexer 213 and the second multiplexer 216. In this way, an output of the first subtractor 212 may be used as the stride ST when the access address AA and the first previous access address A1 are continuous, and an output of the second subtractor 215 may be used as the stride ST when the access address AA and the first previous access address A1 are discontinuous. Details regarding the above will be described later.

The first subtractor 212 is coupled to the first register 211, receives the first previous access address A1 from the first register 211, receives the access address AA, and subtracts the first previous access address A1 from the access address AA to generate a first reference stride ST1. According to one embodiment of the invention, the length of the index value of the access address AA determines the range of the first reference stride ST1. The first subtractor 212 subtracts an index of the first previous access address A1 from an index of the access address AA to obtain the first reference stride ST1.

The first multiplexer 213 has a first input terminal, a second input terminal, a control terminal, and an output terminal. The first input terminal of the first multiplexer 213 is coupled to the first register 211 to receive the first previous access address A1, and the control terminal of the first multiplexer 213 receives the previous address valid signal VA' from the first register 211. The second register 214 is coupled to the output terminal of the first multiplexer 213, and provides a second previous access address A2 to the second input terminal of the first multiplexer 213. According to one embodiment of the invention, the second previous access address A2 may be considered as a first previous access address A1.

The first multiplexer 213 selectively provides the first previous access address A1 or the second previous access address A2 to the second register 214 through the output terminal of the first multiplexer 213 according to the previous address valid signal VA'. Specifically, when the previous address valid signal VA' indicates that the first previous access address A1 is invalid, the first multiplexer 213 can correspondingly provide the second previous access address A2 again to be stored by the second register 214 so as to filter out the invalid first previous access address A1. When the previous address valid signal VA' indicates that the first previous access address A1 is valid, the first multiplexer 213 can correspondingly provide the first previous access address A1 to be stored by the second register 214.

The second subtractor 215 receives the access address AA and the second previous access address A2 output by the second register 214, and subtracts the second previous access address A2 from the access address AA to generate a second reference stride ST2.

In an embodiment, the second subtractor 215 subtracts an index of the second previous access address A2 from the index of the access address AA to obtain the second reference stride ST2. Here, the index, or the bit number of the index of the access address AA refers to a segment of the access address AA.

Attributes of the access address AA, such as a length, a type a bit number and the like, are related to architecture of the high-speed memory 102 that provides the access address AA. For example, when the high-speed memory 102 is of a 36-bit architecture, the access address AA corresponds to 36 bits. According to an embodiment of the disclosure, the access address AA may be a virtual address or a physical address. Each of the attributes of the access address AA can directly affect the calculation of the first reference stride ST1 and the second reference stride ST2. Details regarding the above will be described in more details later.

The second multiplexer 216 has a first input terminal, a second input terminal, a control terminal, and an output terminal. The first input terminal of the second multiplexer 216 receives the first reference stride ST1. The second input terminal of the second multiplexer receives the second reference stride ST2. The control terminal of the second multiplexer 216 receives the previous address valid signal VA'. The output terminal of the second multiplexer 216 is coupled to the comparing module 230.

The second multiplexer 216 selectively provides the first reference stride ST1 or the second reference stride ST2 as the stride ST to the comparing module 230 through the output terminal of the second multiplexer 216 according to the previous address valid signal VA'.

Specifically, when the previous address valid signal VA' indicates that the first previous access address A1 is invalid, the second multiplexer 216 can correspondingly use the second reference stride ST2 as the stride ST to be provided to the comparing module 230. On the other hand, when the previous address valid signal VA' indicates that the first previous access address A1 is valid, the second multiplexer 216 can correspondingly use the first reference stride ST1 as the stride ST to be provided to the comparing module 230. That is to say, the second multiplexer 216 uses the first reference stride ST1 as the stride ST when the access address AA and the first previous access address A1 are continuous, and the second multiplexer 216 uses the second reference stride ST2 as the stride ST when the access address AA and the first previous access address A1 are discontinuous.

The comparing module 230 is coupled to the stride calculating circuit 210, receives the access address AA and the stride ST, and generates at least one reference address according to the access address AA and at least one multiple of the stride ST.

With FIG. 2 as an example, the comparing module 230 can generate 4 reference addresses RA1, RA2, RA3 and RA4 according to the access address AA and 4 multiples (i.e., multiples 1, 2, 3 and 4) of the stride ST. Specifically, the comparing module 230 includes multipliers 231a, 232a, 233a and 234a and subtractors 231b, 232b, 233b and 234b. The multiplier 231a receives the stride ST, multiplies the stride ST by the corresponding multiple 1 to generate 1 times the stride ST, and provides said 1 times the stride ST to the subtractor 231b. Next, the subtractor 231b subtracts said 1 times the stride ST from the access address AA to generate the reference address RA1. That is to say, the reference address RA1 is separated from the access address AA by one stride ST.

Similarly, the multiplier 232a receives the stride ST, multiplies the stride ST by the corresponding multiple 2 to generate 2 times the stride ST, and provides said 2 times the stride ST to the subtractor 232b. Next, the subtractor 232b subtracts said 2 times the stride ST from the access address AA to generate the reference address RA2. That is to say, the reference address RA2 is separated from the access address AA by two strides ST. Based on the above teachings, those skilled in the art should be able correspondingly derive the reference address RA3 (i.e., by subtracting 3 times the stride ST from the access address AA) and the reference address RA4 (i.e., by subtracting 4 times the stride ST from the access address AA), and details regarding the same are not repeated hereinafter.

In other embodiments, other positive integers may also be adopted as the multiples used by the multipliers 231a to 234a for multiplying the stride ST based on requirements, and are not limited to 1, 2, 3 and 4 shown by FIG. 2.

In other embodiments, other numbers of the multiples may also be adopted for multiplying the stride ST based on requirements, and the number of the multiples is not limited to 4 shown by FIG. 2.

According to an embodiment of the disclosure, after obtaining the reference addresses RA1 to RA4, operations performed by the comparing module 230 based on the reference addresses RA1 to RA4 are similar. Therefore, the following merely describes the subsequent operation performed by the comparing module 230 on the reference address RA1, and those skilled in the art should be able to correspondingly derive the operations performed by the comparing module 230 on the reference address RA2 to RA4 based on the following teachings.

In this embodiment, the comparing module 230 compares the reference address RA1 with the history access addresses, generates a first hit indicating bit value HT11 or a second hit indicating bit value HT10, when the reference address RA1 matches one of the history access addresses, or else generates a second hit indicating bit value HT10.

As shown by FIG. 2, in correspondence to the 4 multiples of the stride ST, the comparing module 230 is configured with 4 first hash calculating modules 231c, 232c, 233c and 234c and 4 first history access addresses storage circuits 231d, 232d, 233d and 234d. Among them, the first hash calculating module 231c receives the reference address RA1, and performs a hash operation on a tag of the reference address RA1 to generate a tag hash value TA1.

In different embodiments, the manner in which the first hash calculating module 231c performs the hash operation on the tag of the reference address RA1 to generate the tag hash value TA1 differs according to attributes of the reference address RA1 (i.e., based on the attributes of the access address AA), that is, differs according to the architecture of the high-speed memory 102.

The first history access address storage circuit 231d is coupled to the first hash calculating module 231c, and stores a plurality of history tag hash values corresponding to the history access addresses described above. In this embodiment, the history access addresses are a plurality of access addresses (e.g., The data prefetching auxiliary circuit 104 received 128 access addresses) previously received by the data prefetching auxiliary circuit 104. After these history access addresses are converted into the corresponding history tag hash values, the history tag hash values are stored in the history access address storage circuit 231d through a specific mechanism. Details regarding the above will be described later.

After receiving the tag hash value TA1 through a reading interface RD, the first history access address storage circuit 231d determines whether the tag hash value TA1 matches any of the history tag hash values and outputs a hit indicating bit value. Specifically, if the tag hash value TA1 matches any of the history tag hash values, the first hit indicating bit value HT11 (e.g., logic 1) is output. Otherwise, the second hit indicating bit value HT10 (e.g., logic 0) is output.

Similarly, each of the first hash calculating modules 232c to 234c can also perform the hash operation on the respective tags of the reference addresses RA2 to RA4, and correspondingly provide the tag hash values TA2 to TA4 to the first history access address storage circuits 232d to 234d, respectively. Then, whether the tag hash values match any of the history tag hash values TA2 to TA4 is determined, then first hit indicating bit values HT21, HT31 and HT41 (e.g., logic 1) are output separately if so, or else second hit indicating bit values HT20, HT30 and HT40 (e.g., logic 0) are output. In this embodiment, the history tag hash values stored by each of the first history access address storage circuits 232d to 234d are identical to the history tag hash values stored by the first history access address storage circuit 231d.

In addition, the first history access address storage circuits 231d to 234d are coupled to or disposed with a logical module or a control module (not illustrated) to execute the above operation of determining whether the corresponding one of the tag hash values RA1 to RA4 hits the respectively stored history tag hash values. If hit, the respective first hit indicating bit value (e.g., logic 1) is output; otherwise, the respective second hit indicating bit value (e.g., logic 0) is output. Here, there may be a plurality of logical modules or a plurality of control modules, which are respectively coupled to the first history access address storage circuits 231d to 234d, or respectively disposed in the first history access address storage circuits 231d to 234d. There may also be only one logic module or only one control module, coupled to or intersected with each one of the first history access address storage circuits 231d to 234d.

Then, the stride selecting module 250 coupled to the comparing module 230 receives the first hit indicating bit values and/or the second hit indicating bit values respectively output by the first history access address storage circuits 231d to 234d, and determines whether to conduct prefetching with reference to stride multiples corresponding to the first history access address storage modules 231d to 234d (e.g., the multiples 1, 2, 3 and 4 described above) in the subsequent data prefetching operation according to a prefetch enabling bit value.

Specifically, as shown by FIG. 2, the stride selecting module 250 includes a first register 252, AND gates 254a, 254b, 254c and 254d, and a second register 256. The first register 252 stores prefetch enabling bit values 252a, 252b, 252c and 252d. The prefetch enabling bit values 252a to 252d may be set to corresponding values according to the stride multiples that the user intends to consider. With FIG. 2 as an example, if the user intends to consider stride multiples 1 and 2 in the subsequent data prefetching operation, the prefetch enabling bit values 252a and 252b corresponding to the multiples 1 and 2 may be correspondingly set as 1, and the prefetch enabling bit values 252c and 252d corresponding to the multiples 3 and 4 may be correspondingly set as 2. Naturally, the disclosure is not limited in this regard. For example, if the user intends to prefetch farther and more data more aggressively, the prefetch enable bit values 252a to 252d may all be set as 1 to correspondingly improve the coverage and the timeliness of the data prefetching operation.

The AND gates 254a to 254d are coupled to the first register 252 to receive the prefetch enabling bit values 252a to 252d, respectively. Further, the AND gates 254a to 254d are respectively coupled to the first history access address storage circuits 231d to 234d of the stride selecting module 230 to receive the first hit indicating bit values and/or the second hit indicating bit values output by the first history access address storage circuits 231d to 234d, respectively.

For instance, as shown by FIG. 2, the first history access address storage circuit 231d outputs the second hit indicating bit value HT10 being logic 0, the prefetch enabling bit value 252a being logic 1. The AND gate 254a receives the second hit indicating bit value HT10 and the prefetch enabling bit value 252a being logic 1, and performs an AND operation on the second hit indicating bit value HT10 and the prefetch enabling bit value 252a to generate a first prefetch mark value 256a, e.g., logic 0. Here, the prefetch enabling bit value 252a corresponds to the stride multiple "1". Then, the second register 256 coupled to the AND gate 254a receives and outputs the prefetch mark value 256a. Here, as shown by FIG. 2, although the user intends to consider the stride multiple "1", the stride multiple "1" is found to be unsuitable for the subsequent data prefetching operation and TA1 doesn't match the previous tag hash value stored by the first history access address storage circuit 231d, after the comparison of the first history access address storage circuit 231d, the stride selecting module 230 generates the prefetch mark value 256a being a first value (e.g., logic 0). Then, the second register 256 connected with the AND gate 254a-254d receives, stores and output the prefetch mark value 256a. The prefetch mark value 256a being the first value instructs the prefetching output module 270 not to perform the data prefetching operation according to the stride multiple "1".

As another example, when the first history access address storage circuit 232d outputs the first hit indicating bit value HT21 (e.g., logic 1), if the prefetch enabling bit value 252b corresponding to the stride multiple "2" is logic 1, the AND gate 254b performs the AND operation on the first hit indicating bit value HT21 and the prefetch enabling bit value 252b to generate a second prefetch mark value 256b being logic 1. Then, the second register 256 coupled to the AND gate 254b receives and outputs the prefetch mark value 256b. Here, as shown by FIG. 2, because the user intends to consider the stride multiple "2" and after the comparison of the first history access address storage circuit 232, the TA2 matches the history tag hash value storage by the first history access address storage circuit 232d, the stride multiple "2" is found to be suitable for the subsequent data prefetching operation, the stride selecting module 230 generates the prefetch mark value 256b being a second value (e.g., logic 1). Then, the second register 256 connected with the AND gate 254a-254d receives, stores and output the prefetch mark value 256b. The prefetch mark value 256b being the second value instructs the prefetching output module 270 to perform the data prefetching operation according to the stride multiple "2".

In addition, as shown by FIG. 2, the prefetch enabling bit value 252c corresponding to a stride multiple "3" and the prefetch enabling bit value 252d corresponding to a stride multiple "4" are set as 0. In this case, regardless of the outputs of the first history access address storage circuits 233d and 234d, the stride selecting module 230 generates prefetch mark values 256c and 256d being the first prefetch value (e.g., logic 0). The prefetch mark values 256c and 256d being the first prefetch value received storage and output by the second register 256, and instruct the prefetching output module 270 not to perform the data prefetching operation according to the stride multiples "3" and "4".

Furthermore, as shown by FIG. 2, when the first hit indicating bit value HT21 is selected, the stride selecting module 250 may be regarded as to select the stride multiple "2" without selecting the stride multiples "1", "3" and "4". Among the prefetch mark values 256a to 256d output to the prefetching output module 270, the prefetch mark value 256b is a valid output so that the prefetching output module 270 can perform the data prefetching operation according to the stride multiple "2" instead of according to the stride multiples "1", "3" and "4".

According to another embodiment of the disclosure, it is possible that the stride selecting module 250 is not disposed in the comparing module 230. Instead, the second register 256 directly receives the hit indicating bit values output by the first history access address storage circuits 231d to 234d, and directly outputs the hit indicating bit values. That is to say, the first hit indicating bit values or the second hit indicating bit values are directly received, stored and output to the prefetching output module 270.

According to another embodiment of the disclosure, it is possible that the stride selecting module 250 and the second register 256 are not disposed in the comparing module 230. Instead, the hit indicating bit values are controlled and output to the prefetching output module 270 separately in order by the first history access address storage circuits 231d to 234d.

In view of FIG. 2, to optimize a data prefetching strategy, the prefetching output module 270 may be disposed with an offset ratio register 271 to store an offset ratio OFR. The stored offset ratio OFR, the stride ST and each of said multiples (e.g., the multiple 2 shown by FIG. 2) are multiplied to correspondingly generate each product, and each product is subtracted from the access address AA to generate each first prefetch address. The offset ratio is a value set by the user based on requirements. For instance, if the user intends to prefetch farther data, the offset ratio may be set as a larger value, such as 2, 3, 4, etc. If the user intends to prefetch closer data, the offset ratio may be set as a smaller value, such as 1. Naturally, the present application is not limited in this regard.

As shown by FIG. 2, when the strike multiple "2" is selected as the first hit indicating bit value HT21, such as logic 1. the prefetching output module 270 coupled to the stride selecting module 250 generates a first prefetch address PA2 according to the offset rate OFR, the access address AA and the stride multiple "2". Under the control of the prefetch mark value 256b being the second prefetch mark value, the prefetching output module 270 writes the first prefetch address PA2 into the prefetch queue as the prefetch address, to support the data prefetching operation.

To achieve the above functions, the prefetching output module 270 of FIG. 2 includes the offset ratio register 271, first multipliers 272a, 272b, 272c and 272d, second multipliers 273a, 273b, 273c and 273d, first subtractors 274a, 274b, 274c and 274d, a multiplexer 275, and a prefetch queue 106.

In this embodiment, the first multiplier 272a is coupled to the offset ratio register 271, obtains the offset ratio OFR, and multiplies the offset ratio OFR by the multiple 1 to generate a first reference product. The second multiplier 273a is coupled to the first multiplier 272a to receive the first reference product. The second multiplier 273a further receives the stride ST, and multiplies the stride ST by the first reference product to generate a first product. The first subtractor 274a is coupled to the second multiplier 273a to receive the first product. The first subtractor 274a further receives the access address AA, and subtracts the first product from the access address AA to generate a first prefetch address PA1.

In this embodiment, the first multiplier 272b is coupled to the offset ratio register 271, obtains the offset ratio OFR, and multiplies the offset ratio OFR by the multiple 2 to generate a second reference product. The second multiplier 273b is coupled to the first multiplier 272b to receive the second reference product. The second multiplier 273b further receives the stride ST, and multiplies the stride ST by the second reference product to generate a second product. The first subtractor 274b is coupled to the second multiplier 273b to receive the second product. The first subtractor 274b further receives the access address AA, and subtracts the second product from the access address AA to generate a first prefetch address PA2. Those skilled in the art should be able to correspondingly derive the manner by which first prefetch addresses PA3 and PA4 are generated based on the above teachings, which are not repeated hereinafter.

The multiplexer 275 is coupled to the first subtractors 274a to 274d and receives the first prefetch addresses PA1 to PA4. Further, as controlled by the prefetch mark values 256a to 256d output by the second register 256, the multiplexer 275 select the prefetch mark value being the second prefetch value from the first prefetch addresses PA1 to PA4 as the prefetch address. With FIG. 2 as an example, if the prefetch mark values 256a to 256d are logic 0, logic 1, logic 0 and logic 0 in that sequence, the multiplexer 275 can correspondingly output the first prefetch address PA2 corresponding to the prefetch mark value 256b as the prefetch address. Here, the first prefetch address PA2 is obtained through the calculation based on the stride multiple "2".

Then, the prefetch address being the first prefetch address PA2 is placed into the prefetch queue 106 coupled to the multiplexer 275 to support the data prefetcher 110 for generating a data prefetch request.

According to another embodiment of the disclosure, it is also possible that the prefetching output module 270 does not include the offset ratio register 271 but directly multiplies the stride ST by the multiple to generate the product and subtracts the product from the access address AA to generate the first prefetch address. In this case, the first prefetch address is identical to the reference address.

In brief, the data prefetching auxiliary circuit 104 proposed by the disclosure may be regarded as to detect, by the first history access address storage circuits, whether the reference address separated from the current access address by n strides is previously provided to the data prefetching auxiliary circuit as one history access address. Here, n is the stride multiple being considered, such as the multiples like 1, 2, 3, and 4 described above. If the reference address matches one history access address, the data prefetching auxiliary circuit can generate the prefetch address according to the reference address. Further, the user can determine the selected multiple by setting the prefetch mark value corresponding to the stride multiple. In this way, the accuracy, the coverage and the timeliness of the data prefetching mechanism may be improved to reduce the chance of cache miss.

Moreover, by introducing means for multiplying the reference address by the offset ratio, the data prefetching auxiliary circuit 104 can reasonably prefetch the farther data so as to optimize the coverage and the timeliness of the data prefetching mechanism.

In an embodiment, the user can consider the stride multiples "1", "2", "3" and "4" at the same time. In other words, all the prefetch enabling bit values 252a to 252d are set as 1 so that each of the tag hash values TA1 to TA4 corresponds to one history tag hash value. That is, if the first history access address storage circuits 231d to 234d output the hit indicating bit value as a first hit indicating bit values HT11 to HT41, respectively, the prefetch mark values 256a to 256d are all equal to logic 1 so that the first prefetch addresses PA1 to PA4 are all selected as the prefetch address and placed into the prefetch queue. Accordingly, data corresponding to the first prefetch addresses PA1 to PA4 may be prefetched to effectively improve the coverage and the timeliness of the data prefetching operation.

Further, if the offset ratio OFR is properly set, the data prefetching operation may become more aggressive to improve the timeliness.

As stated before, the specific mechanism through which the history access addresses previously received by the data prefetching auxiliary circuit 104 may be converted into the corresponding history tag hash values and stored in the first history access address storage circuits 231d to 234d will be described in more details as follows.

As shown by FIG. 2, the comparing module 230 further includes a second hash calculating module 235a, a second history access address storage circuit 235b, a first register 235c, an inverter 235d, a second register 235e and a third hash calculating module 235f. The second hash calculating module 235a receives the access address AA, and performs the hash operation on a tag of the access address AA to generate a tag hash value AT, the tag value is a part of the access address. The second history access address storage circuit 235b is coupled to the second hash calculating module 235a and stored with the history tag hash values as similar to the first history access address storage circuits 231d to 234d.

Similar to the first history access address storage circuits 231d to 234d, the second history access address storage circuit 235b also determines whether the tag hash value AT matches any of the history tag hash values by the logic module or the control module, and correspondingly outputs a reference hit indicating bit HT. If the tag hash value AT does match one of the history tag hash values, then the second history access address storage circuit 235b outputs the reference hit indicating bit HT being the first reference hit indicating bit value (e.g., logic 1), or else outputs the reference hit indicating bit HT being the second reference hit indicating bit value (e.g., logic 0). Here, the first value reference hit indicating bit is inverted to the second reference hit indicating bit value.

The first register 235c is coupled to the second history access address storage circuit 235b to store the reference hit indicating bit HT. The inverter 235d is coupled to the first register 235c, inverts the reference hit indicating bit HT to generate an updated enabling bit value HT', and outputs the updated enabling bit value HT' to the first history access address storage circuits 231d to 234d and the second history access address storage circuit 235b. Here, each of the first history access address storage circuits 231d to 234d and the second history access address storage circuit 235b can receive the updated enabling bit value HT' through a respective writing interface WR.

In an embodiment, the reference hit indicating bit HT being the second reference hit indicating bit value (e.g., logic 0), indicates that the tag hash value AT does not match any of the plurality of history tag hash values (e.g., differs from all of the 128 history tag hash values). In this case, after the reference hit indicating bit HT is inverted by the inverter 235d, the updated enabling bit value HT' being logic 1 is generated. Correspondingly, the first history access address storage circuits 231d to 234d and the second history access address storage circuit 235b may conduct a update by replacing one of the history tag hash values with the tag hash value AT in response to the updated enabling bit value HT' being logic 1.

In another embodiment, when the reference hit indicating bit HT being logic 1 indicates that the tag hash value AT matches one of the plurality of history tag hash values (match one of the 128 history tag hash values). In other words, the access address AA is identical to one of the 128 history access addresses corresponding to the history tag hash values. In this case, after the reference hit indicating bit HT is inverted by the inverter 235d, the updated enabling bit value HT' being logic 0 is generated. Correspondingly, the first history access address storage circuits 231d to 234d and the second history access address storage circuit 235b may conduct the update correspondingly in response to the updated enabling bit value HT' being logic 0. Details regarding the update conducted in response to the updated enabling bit value HT' being logic 1 or logic 0 will be described later.

The second register 235e is coupled to the stride calculating circuit 210 to receive, store and output the access address AA and the stride ST. According to an embodiment of the disclosure, as shown by FIG. 2, the third hash calculating module 235f coupled to the second register 235e is independently disposed. The third hash calculating module 235f receives the access address AA, performs the hash operation on the tag of the access address AA to generate the tag hash value AT, and outputs the tag hash value AT to the first history access address storage circuits 231d to 234d and the second history access address storage circuit 235b to update the history tag hash values in the first history access address storage circuits 231d to 234d and the second history access address storage circuit 235b. Each of the first history access address storage circuits 231d to 234d and the second history access address storage circuit 235b can receive the tag hash value AT through the respective writing interface WR, but are not limited thereto.

According to another embodiment of the disclosure, the second hash calculating module 235a receives the access address AA output by the second register 235e, performs the hash operation on the tag of the access address AA to generate the tag hash value AT, and outputs the tag hash value AT to the first history access address storage circuits 231d to 234d and the second history access address storage circuit 235b to update the history tag hash values in the first history access address storage circuits 231d to 234d and the second history access address storage circuit 235b.

As described above, each of the first history access address storage circuits 231d to 234d and the second history access address storage circuit 235b is stored with the identical history tag hash values, and each of the first history access address storage circuits 231d to 234d and the second history access address storage circuit 235b uses a similar technical means for updating the historical tag hash values. Therefore, details regarding the update operation performed in response to the updated enabling bit value HT' being logic 0 or logic 1 will be described below with the first history access address storage circuit 231d taken as an example.

In an embodiment, the plurality of history tag hash values in the first history access address storage circuit 231d are grouped into a plurality of tag hash value groups. Each of the tag hash value groups includes 2 history tag hash values, which are referred to as a first history tag hash value and a second history tag hash value hereinafter. Correspondingly, the logic module or the control module may further include a storage module, which is connected to the first history access address storage circuit 231d and configured to record a plurality of indicating bit values. The plurality of indicating bit values correspond to the tag hash value groups in a one-to-one manner.

For instance, if there are 128 history tag hash values stored in the first history access address storage circuit 231*d*, the 128 history tag hash values are divided into 64 tag hash value groups. Among them, each of the tag hash value groups includes 2 history tag hash values (i.e., the first history tag hash value and the second history tag hash value), and each of the tag hash value groups corresponds to one of 64 indicating bit values. In this case, the logic module or the control module may include a cache of 64 row×1 column, and each column records a 1-bit indicating bit value for corresponding to each of the tag hash value groups. Here, the indicating bit value may be the first indicating bit value or the second indicating bit value.

In an embodiment, the first history tag hash value and the second history tag hash value may be regarded as an MRU (Most Recently Used) history tag hash value and a LRU (Least Recently Used) history tag hash value respectively. The MRU (Most Recently Used) history tag hash value and the LRU (Least Recently Used) history tag hash value correspond to a most recently used access address and a least recently used access address respectively. However, the present application is not limited in this regard.

In an embodiment, the updated enabling bit value HT' being the second value (e.g., logic 1) indicates that the access address AA is different from all of the plurality of history access addresses corresponding to the plurality of history tag hash values. In other words, the access address AA may be considered as a relatively new address. In this case, the tag hash value AT corresponding to the access address AA is adopted to replace one of the 128 history tag hash values in the first history access address storage circuit 231*d*. Specifically, the logic module or the control module arbitrarily selects one indicating bit value being the second value (e.g., logic 1) from the 64 indicating bit values as a first indicating bit value, finds a first tag hash value group corresponding to the first indicating bit value from the 64 tag hash value groups, inserts the tag hash value AT to a first history tag hash value position (MRU position) in the first tag hash value group as the new first history tag hash value, moves the original first history tag hash value to a second history tag hash value position (LRU position), and discards the original second history tag hash value.

In an embodiment, the updated enabling bit value HT' being the first value (e.g., logic 0) indicates that the access address AA is identical to one of the plurality of history access addresses corresponding to the plurality of history tag hash values. In other words, since the tag hash value AT matches one of the plurality of stored history tag hash values, the access address AA is not a new address. In this case, the logic module or the control module finds the history tag hash value corresponding to the tag hash value AT, and uses the history tag hash value as the first history tag hash value of the corresponding tag hash value group (hereinafter referred to as a second tag hash value group). Specifically, when the history tag hash value is the first history tag hash value of the second tag hash value group, no operation is performed on the second tag hash value group. When the history tag hash value is the second history tag hash value of the second tag hash value group, the first history tag hash value of the second tag hash value group is swapped with the second history tag hash value. That is, the first history tag hash value of the second tag hash value group is set to the second history tag hash value position (LRU position), and the second history tag hash value of the second tag hash value group is set to the first history tag hash value position (MRU position).

According to an embodiment of the disclosure, when the history tag hash value corresponding to the tag hash value AT is the first history tag hash value in the second tag hash value group, the indicating bit value is set as the first value (e.g., logic 0). When the history tag hash value corresponding to the tag hash value AT is the second history tag hash value in the second tag hash value group, the indicating bit value is set as the second value (e.g., logic 1).

In an embodiment, each of the first history access address storage circuits 232*d* to 234*d* and the second history access address storage circuit 235*b* may be coupled to, in a one-to-one manner, or may include the logic module or the control module of non-shared type. In this way, the logic module or the control module can allow the first history access address storage circuits 232*d* to 234*d* and the second history access address storage circuit 235*b* to perform the operation of updating the stored history tag hash values and the indicating bit values as taught above respectively based on the updated enabling bit value HT' and the tag hash value AT, so as to achieve the effect of accurate control.

In another embodiment, the first history access address storage circuits 231*d* to 234*d* and the second history access address storage circuit 235*b* may also be commonly connected to the logic module or the control module of shared type in a many-to-one manner to collectively update the stored history tag hash values and the indicating bit values based on the above teachings, so as to achieve the effect of saving circuit area.

In addition, according to an embodiment of the disclosure, other than receiving, storing and outputting data separately, the first register 235*c*, the second register 256 and the second register 235*e* shown by FIG. 2 can also constitute a cache synchronization module for ensuring that the data are transmitted to the first register 235*c*, the second register 256 and the second register 235*e* within the same clock cycle.

In brief, the disclosure can first determine whether the tag hash value AT converted from the access address AA matches any one of the stored history tag hash values (i.e., whether the access address AA is identical to one of the history access addresses corresponding to the history tag hash values), and decide the manner in which the stored history tag hash values and the indicating bit values are updated according to a determination result. If the access address AA is determined as not matching any history access address, the tag hash value AT is used to replace one of the first history tag hash values. Conversely, if the tag hash value AT is determined as matching any one of the history tag hash values (i.e., matching a specific history tag hash value), whether to update the second history tag hash value or not may be determined according to the specific history tag hash value being MRU or LRU, and the indicating bit value corresponding to the tag hash value group to which the specific history tag hash value belongs may be adjusted according to the specific history tag hash value being MRU or LRU.

In this way, the history tag hash values stored by each of the first history access address storage circuits 231*d* to 234*d* can better reflect the behavior of the data prefetching auxiliary circuit 104 receiving the access address in the past. Accordingly, when the first history access address storage circuits 231*d* to 234*d* compare the tag hash values TA1 to TA4 (which are corresponding to the multiples 1, 2, 3 and 4, respectively) with the stored history tag hash values, the stride multiple suitable for the subsequent data prefetching operation may be better determined. As a result, the accuracy of the data prefetching operation may be improved.

Further, by grouping each two of the stored history tag hash values into one tag hash value group, each of the history tag hash values may be maintained for a longer period of time in the respective tag hash value group without being replaced too quickly.

Moreover, if each of the first history access address storage circuits 231d to 234d and the second history access address storage circuit 235b is merely stored with a limited number of history tag hash values (e.g., 128), there is not need to adopt a storage circuit with larger capacity so the effect of cost saving may be achieved. For instance, in certain embodiments, when the length of the access address AA is 32 bits, a length of the corresponding tag hash value TA1 may be 12 bits. In this case, the capacity of the first history access address storage circuit 231d requires only 128×12 bits (i.e., 192 bytes) to implement the concept proposed by the disclosure. In other words, under the architecture shown by FIG. 2, the first history access address storage circuits 231d to 234d and the second history access address storage circuit 235b can be realized with the capacity of only 960 bytes in total.

Moreover, in general, although a characteristic of multiple inputs corresponding to the same output may occur when the hash operation is performed, the limited number of history tag hash values stored having certain degree of spatial locality and temporal locality can allow each of the tag hash values TA1 to TA4 obtained based on the hash operation to correspond to only one result.

Figure 3:
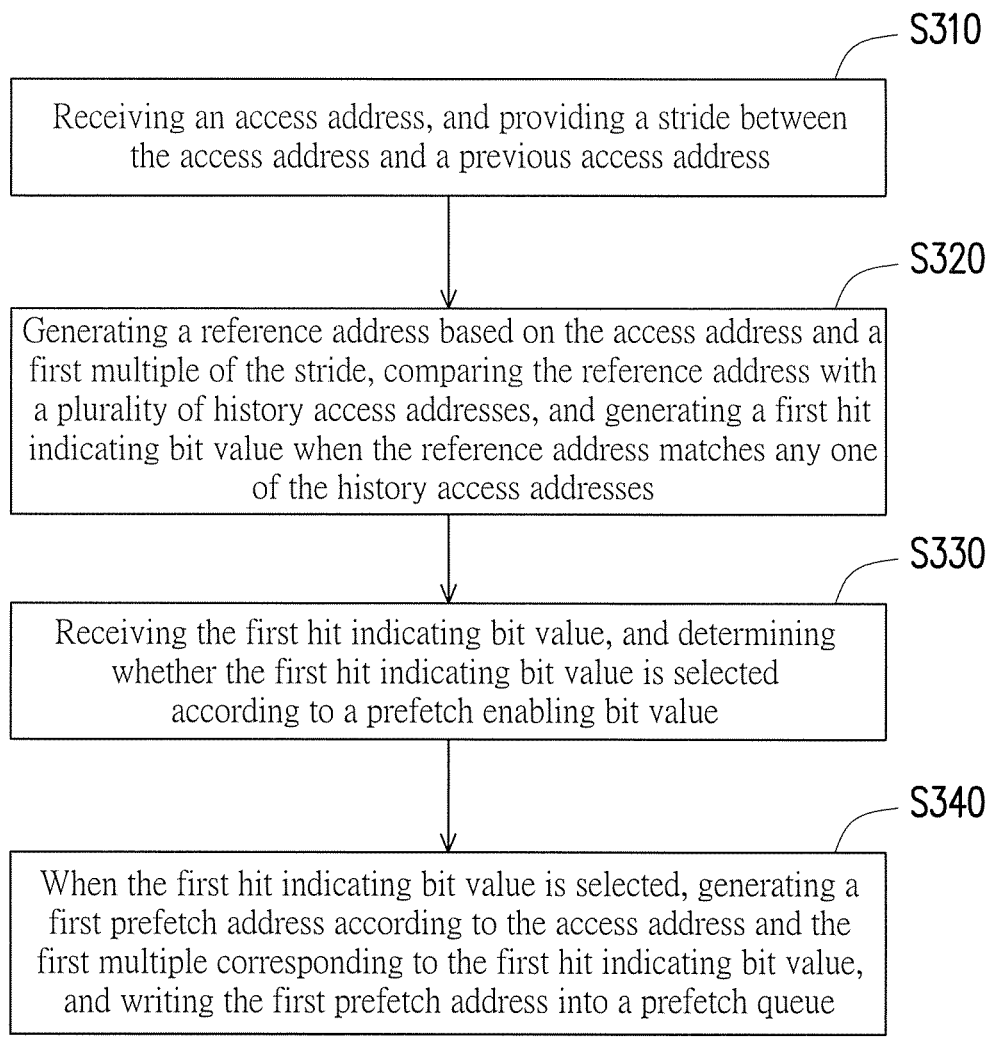
FIG. 3 is a flowchart illustrating a data prefetching method in an embodiment of the disclosure.

With reference to FIG. 3, FIG. 3 is a flowchart illustrating a data prefetching method in an embodiment of the disclosure. The method of FIG. 3 may be executed by the data prefetching auxiliary circuit 104 of FIG. 2, and each step of FIG. 3 is described below with reference to elements shown by FIG. 2.

First of all, in step S310, the stride calculating circuit 210 can receive the access address AA, and provide the stride ST between the access address AA and a previous access address (e.g., the first previous access address A1).

In step S320, the comparing module 230 can generate a reference address (e.g., the reference addresses RA1 to RA4) according to the access address AA and a first multiple (e.g., 1, 2, 3 and/or 4) of the stride ST, compare the reference address with a plurality of history access addresses, and generate a first hit indicating bit value (e.g., the first history access address HT21) when the reference address matches any of the history access addresses.

In step S330, the stride selecting module 250 can receive the first hit indicating bit value, and determine whether the first hit indicating bit value is selected according to a prefetch enabling bit value (e.g., the prefetch enabling bit values 252a to 252d).

In step S340, when the first hit indicating bit value is selected, the prefetching output module 270 can generate a first prefetch address (e.g., the first prefetch address PA2) according to the access address AA and the first multiple (e.g., 2) corresponding to the first hit indicating bit value, and use the first prefetch address as a prefetch address to be written into the prefetch queue.

Details regarding each step above may refer to the description in the embodiment of FIG. 2, which is not repeated hereinafter.

In summary, the data prefetching auxiliary circuit, the data prefetching method and the microprocessor may be regarded as to detect, by the first history access address storage circuits, whether the reference address separated from the current access address by n strides is previously provided to the prefetch queue as the history access address in the past. Here, n is the stride multiple being considered, such as 1, 2, 3, 4 shown in FIG. 2. If the reference address is once the history access address used in the past, and has the prefetch enabling bit value corresponding to the stride multiple in an enabled state (i.e., the stride multiple that user intends to consider), the corresponding first prefetch address may be used as the prefetch address to be written into the prefetch queue so the data prefetcher can perform the subsequent data prefetching operation according to the prefetch address. In this way, the accuracy, the coverage and the timeliness of the data prefetching mechanism may be improved to reduce the chance of cache miss.

Moreover, by introducing means for multiplying the reference address by the offset ratio, the data prefetching auxiliary circuit can output a more reasonable address so as to optimize the coverage and the timeliness of the data prefetching mechanism.

In addition, the disclosure further proposes a related mechanism for updating the history tag hash value, which can first determine whether the tag hash value converted from the access address matches one of the stored history tag hash values, and determine the manner in which the stored history tag hash value and the indicating bit value are updated according to the determination result. In this way, the stored history tag hash values can better reflect the behavior of the data prefetching auxiliary circuit receiving the access address in the past. Accordingly, when the first history access address storage circuits compare the tag hash values with the stored history tag hash values, which of the stride multiples is more suitable for the subsequent data prefetching operation may be determined more accurately. As a result, the accuracy of the data prefetching operation may be improved.

According to an embodiment of the disclosure, the data prefetching auxiliary circuit and the prefetching system described in the present application are used to coordinate a data communication between memories with different storing speeds. The data prefetching auxiliary circuit is configured to write the access addresses corresponding to the most recently used or repeatedly used data into the prefetch queue for allowing the prefetcher to instruct copying the data in the low-speed memory to the high-speed memory. Naturally, the practical applications are not limited to one group of high and low speed memories, and the number of prefetching systems described in this application may also be dynamically adjusted according to the number of groups of high and low speed memories and the actual requirements of users. Detailed description regarding the same is described as follows.

Figure 4:
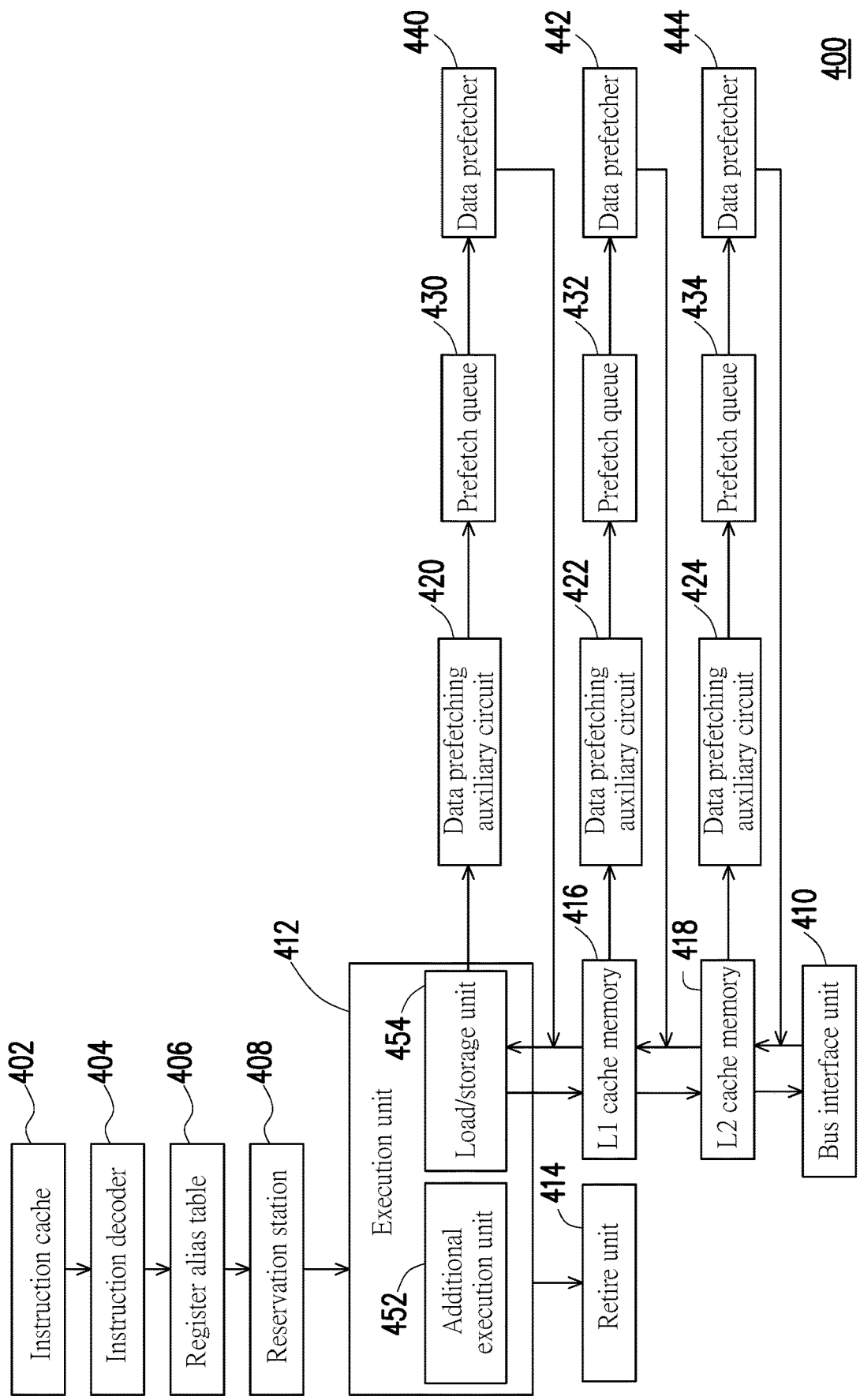
FIG. 4 is a schematic diagram of a processor according to an embodiment of the disclosure.

FIG. 4 is a schematic diagram of a microprocessor 400 according to an embodiment of the disclosure. With reference to FIG. 4, the microprocessor 400 includes a pipeline system and a prefetching system. The pipeline system includes an instruction cache 402, an instruction decoder 404, a register alias table (RAT) 406, a reservation station 408, an execution unit 412 and a retire unit 414. Here, the execution unit 412 includes a load/storage unit 454 and an additional execution unit 452. The prefetching system includes the load/storage unit 454 in the execution unit 412, a level-1 (L1) cache memory 416, a level-2 (L2) cache memory 418, a bus interface unit 410 and an internal memory (not illustrated), data prefetching auxiliary circuits 420 to 424, prefetch queues 430 to 434 and data prefetchers 440 to 444.

As shown by FIG. 4, the instruction cache 402 is coupled to the instruction decoder 404; the instruction decoder 404 is coupled to the register alias table 406; the register alias table 406 is coupled to the reservation station 408; the reservation station 408 is coupled to the execution unit 412; and the execution unit 412 is coupled to the retire unit 414. The instruction decoder 404 may include an instruction translator, which is used to translate a macro (e.g., a x86 architecture macro) into a microinstruction set of the microprocessor 400 similar to the RISC micro-architecture. The reservation station 408 issues instructions to the execution unit 412 for execution in a non-program order. The retire unit 414 includes a reorder buffer for performing retirement of instructions in a program order. The execution 412 includes the load/storage unit 454 and the additional execution unit 452, and the additional execution unit 452 may be an integer unit, a floating unit, a branch unit or a single instruction/multiple data (SIMD) unit.

As shown by FIG. 4, the load/storage unit 454 is coupled to the level-1 cache memory 416 to support a read/write operation of the level-1 cache memory 416. The level-1 cache memory 416 is coupled to the level-2 cache memory 418 to support a read/write operation of the level-2 cache memory 418. The level-2 cache memory 418 is coupled to the bus interface unit 410 to support a read/write operation for reading/writing the internal memory (not illustrated). The bus interface unit 410 is a coupled bus (e.g., a local bus or a memory bus) for coupling the microprocessor 400 to a system memory.

As shown by FIG. 4, the data prefetching auxiliary circuits 420 to 424 are respectively coupled to the load/storage unit 454, the level-1 cache memory 416 and the level-2 cache memory 418 to receive the access address separately. The data prefetching auxiliary circuits 420 to 424 are further coupled to the corresponding prefetch queues 430 to 434, respectively, so as to write the prefetch address into the corresponding prefetch queue. The data prefetchers 440 to 444 are respectively coupled to the prefetch queues 430 to 434 to separately generate a prefetch request according to the prefetch address.

Specifically, the load/storage unit 454, the data prefetching auxiliary circuit 420, the prefetch queue 430, the data prefetcher 440 and the level-1 cache memory 416 shown by FIG. 4 constitute a first sub prefetching system. The level-1 cache memory 416, the data prefetching auxiliary circuit 422, the prefetch queue 432, the data prefetcher 442 and the level-2 cache memory 418 shown by FIG. 4 constitute a second sub prefetching system. The level-2 cache memory 418, the data prefetching auxiliary circuit 424, the prefetch queue 434, the data prefetcher 444 and the system memory shown by FIG. 4 form a third sub prefetching system.

According to an embodiment of the disclosure, a length of the index of the access address AA determines a value range of the first reference stride ST1, the first reference stride ST2 in the data prefetching auxiliary circuits 420 to 424. In the second sub prefetching system shown by FIG. 4, the access address AA is provided by the level-1 cache memory 416 and is the virtual address. When the length of the access address AA is 36 bits, with the lowest bit being the 0th bit, the 0th bit to the 5th bit are the offset; the 6th bit to the m-th bit are the index; and the (m+1)-th bit to the 35th bit are the tag. First of all, because at least 6 bits are required for setting the index of the access address AA in the level-1 cache memory 416, the value of m needs to be greater than 11. Meanwhile, a value range of the stride ST varies with the value of m. For example, if m is 15, the index of the access address AA is 10 bits, and the stride ST calculated according to the index of the access address AA may be an integer fetched from [−1024, 1023]. If m is 13, the index of the access address AA is 8 bits, and the stride ST calculated according to the index of the access address AA may be an integer fetched from [−256, 255]. Nevertheless, the disclosure is not limited in this regard. In the third sub prefetching system shown by FIG. 4, the access address AA is provided by the leveln-2 cache memory 418 and is the physical address. As the lowest bit of the access address AA being the 0th bit, the 0th bit to the 5th bit of the access address AA are the offset; the 6th bit to the 11th bit are the index; and the 12th bit to the highest bits are the tag. The stride ST calculated according to the index of the access address AA may be an integer fetched from [−64, 63].

According to an embodiment of the disclosure, the high-speed memory unit of each of the sub prefetching systems (e.g., the load/storage unit 454, the level-1 cache memory 416 and the level-2 cache memory 418) may adopt the access address with different attributes. Therefore, the hash operations executed between the first to the third sub prefetching systems may also be different. For instance, when a length of the reference address is 32 bits, the tag hash value may be calculated by adopting "address[23:12]+address[31:24]". Here, "address[a:b]" denotes the a-th bit to the b-th bit of the reference address (with the lowest being the 0th bit). In this case, the calculated length of the tag hash value is 12 bits. When the length of the reference address is 36 bits, the tag hash value may be calculated by adopting "address[23:12] xor address[35:24]". When the length of the reference address is 48 bits, the tag hash value may be calculated by adopting "(address[23:12] xor address[35:24])+address[47:36]". When the length of the reference address is 64 bits, the tag hash value TA1 may be calculated by adopting "(address[23:12] xor address[35:24] xor address[47:36])+address[63:48]".

According to another embodiment of the disclosure, whether to dispose the sub prefetching system for each relatively high speed memory (e.g., to dispose all, one, or two of the first to the third sub prefetching systems shown by FIG. 4) may be determined by the user based on actual requirements.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A data prefetching auxiliary circuit for generating a prefetch address, the data prefetching auxiliary circuit comprising:
   a stride calculating circuit, receiving an access address to calculate and provide a stride between the access address and a previous access address;
   a comparing module, coupled to the stride calculating circuit to receive the access address and the stride, wherein the comparing module generates a reference address based on the access address and a product of a positive integer N and the stride, wherein the comparing module generates a hit indicating bit value based on a matching result between the reference address and one of a plurality of history access addresses;
   a stride selecting module, coupled to the comparing module to receive the hit indicating bit value, wherein the stride selecting module outputs a prefetch mark value based on a prefetch enabling bit value and the hit indicating bit value; and a prefetching output module, coupled to the stride selecting module to receive the prefetch mark value, wherein the prefetching output module determines and outputs the prefetch address according to the prefetch mark value.

2. The data prefetching auxiliary circuit according to claim 1, wherein the data prefetching auxiliary circuit is coupled to a first memory to receive the access address output by the first memory;

the data prefetching auxiliary circuit is coupled to a prefetch queue to write the prefetch address into the prefetch queue;

the prefetch queue is coupled to a data prefetcher to make the prefetch address in the prefetch queue is read by the data prefetcher, and the data prefetcher generates a data prefetch instruction according to the prefetch address; and the data prefetch instruction instructs prefetching data corresponding to the prefetch address in a second memory to the first memory.

3. The data prefetching auxiliary circuit according to claim 1, wherein the stride calculating circuit comprises:

a first register, receiving the access address and an address valid signal, and generating a previous address valid signal and a first previous access address;

a first subtractor, coupled to the first register, receiving the first previous access address from the first register, receiving the access address, and subtracting the first previous access address from the access address to generate a first reference stride;

a first multiplexer, having a first input terminal, a second input terminal, a control terminal, and an output terminal, the first input terminal of the first multiplexer being coupled to the first register to receive the first previous access address, the control terminal of the first multiplexer receiving the previous address valid signal from the first register;

a second register, coupled to the output terminal of the first multiplexer, and providing a second previous access address to the second input terminal of the first multiplexer, wherein the first multiplexer selectively provides the first previous access address or the second previous access address to the second register through the output terminal of the first multiplexer according to the previous address valid signal;

a second subtractor, receiving the access address and the second previous access address output by the second register, and subtracting the second previous access address from the access address to generate a second reference stride; and a second multiplexer, having a first input terminal, a second input terminal, a control terminal and an output terminal, the first input terminal of the second multiplexer receiving the first reference stride, the second input terminal of the second multiplexer receiving the second reference stride, the control terminal of the second multiplexer receiving the previous address valid signal, the output terminal of the second multiplexer being coupled to the comparing module, wherein the second multiplexer selectively provides the first reference stride or the second reference stride as the stride to the comparing module through the output terminal of the second multiplexer according to the previous address valid signal.

4. The data prefetching auxiliary circuit according to claim 1, wherein the comparing module comprises:

a multiplier, receiving the stride and the positive integer N, and multiplying the stride by the positive integer N to generate a first product; and a subtractor, receiving the access address, coupling to the multiplier to receiving the first product, and subtracting the first product from the access address to generate the reference address.

5. The data prefetching auxiliary circuit according to claim 1, wherein the comparing module comprises:

a first hash calculating module, receiving the reference address, and performing a hash operation on a tag of the reference address to generate a first tag hash value; and a first history access address storage circuit, coupled to the first hash calculating module, storing a plurality of history tag hash values corresponding to the plurality of history access addresses, when the first tag hash value matches any of the history tag hash values by a logic module, then setting the hit indicating bit value as a first hit indicating bit value, when the first tag hash value doesn't match any of the history tag hash values by a logic module, then setting the hit indicating bit value as a second hit indicating bit value.

6. The data prefetching auxiliary circuit according to claim 5, wherein the comparing module comprises:

a second hash calculating module, receiving the access address, and performing the hash operation on a tag of the access address to generate a second tag hash value; and a second history access address storage circuit, coupled to the second hash calculating module and received the second tag hash value, storing the history tag hash values, determining whether the second tag hash value matches any of the history tag hash values by a logic module, and correspondingly outputting a reference hit indicating bit by the logic module, wherein when the second tag hash value matches any of the history tag hash values, then the reference hit indicating bit is a first value, when the second tag hash value does not match any of the history tag hash values, the reference hit indicating bit is a second value; and an inverter, inverting the reference hit indicating bit to generate an updated enabling bit value, and outputting the updated enabling bit value to the first history access address storage circuit and the second history access address storage circuit, the updated enabling bit value determining whether to update the history tag hash values of the first history access address storage circuit and the history tag hash values of the second history access address storage circuit by a specified tag hash value.

7. The data prefetching auxiliary circuit according to claim 6, wherein a second hash calculating module outputting the second tag hash value to the first history access address storage circuit and the second history access address storage circuit, the second tag hash value is the specified tag hash value.

8. The data prefetching auxiliary circuit according to claim 6, wherein the comparing module further comprises:

a third hash calculating module, receiving the access address, performing the hash operation on the tag of the access address to generate a third tag hash value, and outputting the third tag hash value to the first history access address storage circuit and the second history access address storage circuit, the third tag hash value is the specified tag hash value.

9. The data prefetching auxiliary circuit according to claim 6, wherein the plurality of history tag hash values in the first history access address storage circuit are grouped into a plurality of tag hash value groups, each of the tag hash value groups comprising a first history tag hash value and a second history tag hash value, the logic module recording a plurality of indicating bit values, the indicating bit values corresponding to the tag hash value groups in a one-to-one manner, each of the indicating bit values being a first indicating bit value or a second indicating bit value, wherein when the updated enabling bit value is a first updated enabling bit value, the logic module finds one of the first indicating bit values from the indicating bit values, finds a first tag hash value group corresponding to said one of the first indicating bit values from the tag hash value groups, and replaces the first history tag hash value of the first tag hash value group by the specified tag hash value.

10. The data prefetching auxiliary circuit according to claim 9, wherein when the updated enabling bit value is a second updated enabling bit value, the logic circuit finds a specific history tag hash value matching the specified tag hash value from the history tag hash values, finds a second tag hash value group to which the specific history tag hash value belongs from the tag hash value groups, setting the specific history tag hash value as the first history tag hash value of the second tag hash value, and finds the indicating bit value corresponding to the second tag hash value group from the indicating bit values, wherein the logic module sets the indicating bit value as the second indicating bit value when the specific history tag hash value is the first history tag hash value in the second tag hash value group, and the logic module sets the indicating bit value as the first indicating bit value when the specific history tag hash value is the second history tag hash value in the second tag hash value group.

11. The data prefetching auxiliary circuit according to claim 1, wherein the stride selecting module comprises:

an AND gate, receiving the prefetch enabling bit value and the hit indicating bit value, and performing an AND operation on the hit indicating bit value and the prefetch enabling bit value to generate the prefetch mark value, wherein the prefetch mark value being a first prefetch mark value indicates that the hit indicating bit value is a first hit indicating bit value and the positive integer N is selected; and the prefetch mark value being a second prefetch mark value indicates that the hit indicating bit value is a second hit indicating bit value or the positive integer N is not selected.

12. The data prefetching auxiliary circuit according to claim 1, wherein the prefetching output module further comprising:

a multiplier, receiving the stride and the positive integer N, multiplying the stride by the positive integer N to generate a first reference product, and a subtractor, receiving the access address, coupling to the multiplier to receiving the first product, and subtracting the first reference product from the access address to generate a first prefetch address.

13. The data prefetching auxiliary circuit according to claim 12, wherein the prefetching output module comprises:

a multiplexer, receiving the first prefetch address and the prefetch mark value, and determining whether to use the first prefetch address as the prefetch address according to the prefetch mark value.

14. The data prefetching auxiliary circuit according to claim 1, wherein the prefetching output module further comprising:

a multiplier, receiving an offset ratio, the positive integer N and the strike, multiplying the stride by an offset ratio and the positive integer N to generate a second product; and a subtractor, receiving the access address, coupling to the multiplier to receiving the second product, subtracting the second product from the access address to generate the first prefetch address.

15. A data prefetching method, comprising:

receiving an access address, and calculating and providing a stride between the access address and a previous access address;

generating a reference address based on the access address and a product of a positive integer N and the stride, and generating a hit indicating bit value based on a matching result between the reference address and one of a plurality of history access addresses;

outputting a prefetch mark value based on the prefetch enabling bit value and the hit indicating bit value; and outputting the prefetch address according to the prefetch mark value.

16. The method according to claim 15, wherein the step of receiving the access address, and calculating and providing the strike between the access address and the previous access address further comprising:

receiving the access address and an address valid signal, and generating a previous address valid signal and a first previous access address;

providing a second previous access address according to the previous address valid signal and the first previous access address;

subtracting the first previous access address from the access address to generate a first reference stride;

subtracting the second previous access address from the access address to generate a second reference stride; and when the first previous access address indicating the previous access address is valid, providing the first reference stride as the strike, when the first previous access address indicating the previous access address is invalid, providing the second reference stride as the strike.

17. The method according to claim 15, wherein the step of generating the reference address based on the access address and a product of a positive integer N and the stride further comprising:

multiplying the stride by the positive integer N to generate a first product; and subtracting the first product from the access address to generate the reference address.

18. The method according to claim 15, wherein the step of generating the hit indicating bit value based on the matching result between the reference address and one of the history access addresses comprises:

performing a hash operation on a tag of the reference address to generate a first tag hash value; and determining whether the first tag hash value matches a plurality of history tag hash values which is corresponding with the plurality of history access addresses, when the first tag hash value matches any of the history tag hash values by a logic module, then setting the hit indicating bit value as a first hit indicating bit value, when the first tag hash value does not match any of the history tag hash values by a logic module, then setting the hit indicating bit value as a second hit indicating bit value.

19. The method according to claim 18, further comprising:
performing a hash operation on a tag of the access address to generate a second tag hash value;
determining whether the second tag hash value matches any of the history tag hash values, and correspondingly outputting a reference hit indicating bit, wherein when the second tag hash value does not match any of the history tag hash values, then the reference hit indicating bit is a first value, when the second tag hash value matches any of the history tag hash values, the reference hit indicating bit is a second value; and
inverting the reference hit indicating bit to generate an updated enabling bit value, the updated enabling bit value determining whether to update the history tag hash values of the first history access address storage circuit and the history tag hash values of the second history access address storage circuit by a specified tag hash value.

20. The method according to claim 19, further comprising:
outputting the second tag hash value to the first history access address storage circuit and the second history access address storage circuit, the second tag hash value is the specified tag hash value.

21. The method according to claim 19, further comprising:
performing the hash operation on the tag of the access address to generate a third tag hash value, and outputting the third tag hash value to the first history access address storage circuit and the second history access address storage circuit, the third tag hash value is the specified tag hash value.

22. The method according to claim 19, further comprising:
grouping the history tag hash values in the first history access address storage circuit into a plurality of tag hash value groups, each of the tag hash value groups comprising a first history tag hash value and a second history tag hash value; and
recording a plurality of indicating bit values, the indicating bit values corresponding to the tag hash value groups in a one-to-one manner, each of the indicating bit values being a first indicating bit value or a second indicating bit value,
wherein when the updated enabling bit value is a first updated enabling bit value, finding one of the first indicating bit values from the indicating bit values, and finding a first tag hash value group corresponding to said one of the first indicating bit values from the tag hash value groups, and the first history tag hash value is replaced by the third tag hash value.

23. The method according to claim 22, wherein when the updated enabling bit value is a second updated enabling bit value, finding a specific history tag hash value matching the specified tag hash value from the history tag hash values, finding a second tag hash value group to which the specific history tag hash value belongs from the tag hash value groups, setting the specific history tag hash value as the first history tag hash value of the second tag hash value, and finding the indicating bit value corresponding to the second tag hash value group from the indicating bit values,
wherein setting the indicating bit value as the second indicating bit value when the specific history tag hash value is the first history tag hash value in the second tag hash value group, and setting the indicating bit value as the first indicating bit value when the specific history tag hash value is the second history tag hash value in the second tag hash value group.

24. The method according to claim 15, wherein the step of outputting the prefetch mark value based on the prefetch enabling bit value and the hit indicating bit value comprises:
performing an AND operation on the hit indicating bit value and the prefetch enabling bit value to generate the prefetch mark value, wherein the prefetch mark value being a first prefetch mark value indicates that the hit indicating bit value is a first hit indicating bit value and the positive integer N is selected, and the prefetch mark value being a second prefetch value indicates that the hit indicating bit value is a second hit indicating bit value and the first multiple is not selected.

25. The method according to claim 15, wherein the step of outputting the prefetch address according to the prefetch mark value comprises:
multiplying the stride by the positive integer N to generate a first reference product;
subtracting the first reference product from the access address to generate a first prefetch address; and
determining whether to use the first prefetch address as the prefetch address according to the prefetch mark value.

26. The method according to claim 15, wherein the step of outputting the prefetch address according to the prefetch mark value comprises:
multiplying the stride by the positive integer N and an offset ratio to generate a second reference product;
subtracting the second reference product from the access address to generate a first prefetch address; and
determining whether to use the first prefetch address as the prefetch address according to the prefetch mark value.

27. A microprocessor, comprising a pipeline system and a prefetching system, wherein the prefetching system comprises:
a first memory, generating and outputting a first access address;
a second memory, coupled to the first memory;
a first data prefetching auxiliary circuit, coupled to the first memory to receive the first access address from the first memory, and generating and outputting a second prefetch address to a first prefetch queue, wherein the first data prefetching auxiliary circuit is configured to generate a reference address based on the first access address and a product of a positive integer N and a stride, and configured to generate the second prefetch address based on a matching result between the reference address and one of a plurality of history access addresses; and
a first data prefetcher, reading the second prefetch address from the first prefetch queue to generate a first prefetch instruction, wherein the first prefetch instruction instructs prefetching data corresponding to the second prefetch address from the second memory to the first memory,
wherein the first data prefetching auxiliary circuit is disposed in a data transmitting path between the first memory and the first data prefetcher.

28. The microprocessor according to claim 27, wherein the prefetching system further comprises:

a third memory, coupled to the second memory;

a second data prefetching auxiliary circuit, coupled to the second memory to receive a second access address output by the second memory, and generating and outputting a third prefetch address to a second prefetch queue; and a second data prefetcher, reading the third prefetch address from the second prefetch queue to generate a second prefetch instruction, the second prefetch instruction instructing prefetching data corresponding to the third prefetch address in the third memory to the second memory.

29. The microprocessor according to claim 27, wherein the first data prefetching auxiliary circuit comprises:

a stride calculating circuit, receiving the first access address to calculate and provide a stride between the first access address and a previous access address;

a comparing module, coupled to the stride calculating circuit to receive the first access address and the stride, generating the reference address based on the first access address and the product of a positive integer N and the stride, and generating a hit indicating bit value based on the matching result between the reference address and one of the plurality of history access addresses;

a stride selecting module, coupled to the comparing module to receive the hit indicating bit value, wherein the stride selecting module outputs a prefetch mark value based on a prefetch enabling bit value and the hit indicating bit value; and a prefetching output module, coupled to the stride selecting module to receive the prefetch mark value, wherein the prefetching output module determines and outputs the prefetch address according to the prefetch mark value.

30. A data prefetching auxiliary circuit for receiving an access address and outputting a prefetch address, the data prefetching auxiliary circuit comprising:

a stride calculating circuit, receiving the access address to calculate and provide a stride between the access address and a previous access address;

a comparing module, coupled to the stride calculating circuit to receive the access address and the stride, wherein the comparing module generates a reference address based on the access address and a product of a positive integer N and the stride, wherein the comparing module generates a hit indicating bit value based on a matching result between the reference address and one of a plurality of history access addresses; and a prefetching output module, coupled to the comparing module to receive the hit indicating bit value, and determining the prefetch address according to the hit indicating bit value.

* * * * *